Sept. 16, 1952    F. W. RIEDEL    2,610,551
INDEXING DEVICE
Filed Sept. 11, 1946    4 Sheets-Sheet 3
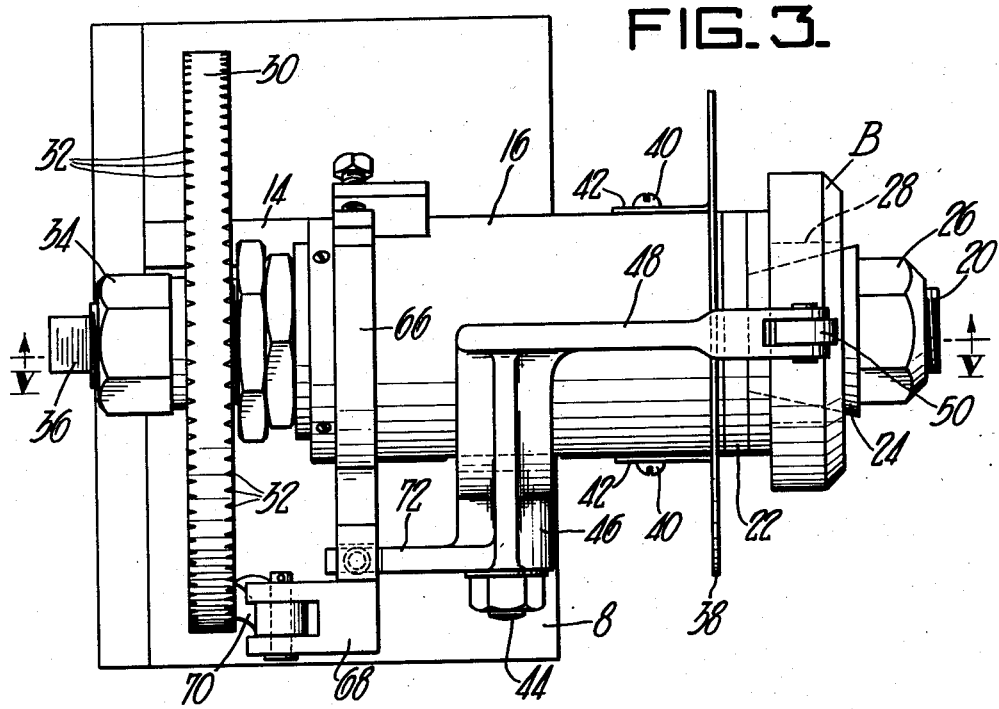
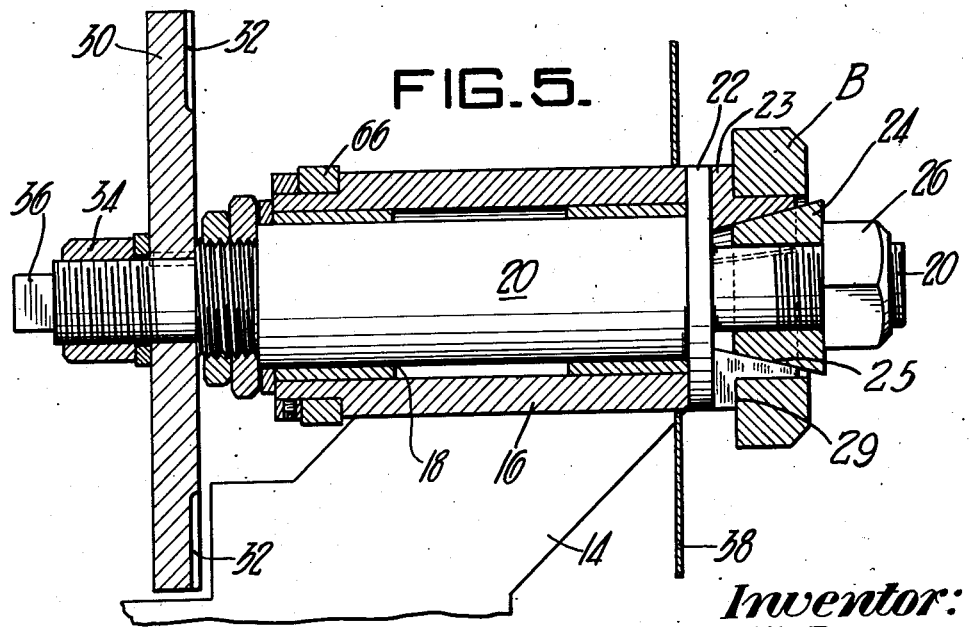
Inventor:
FREDERICK W. RIEDEL,
by: Donald G. Dalton
his Attorney.

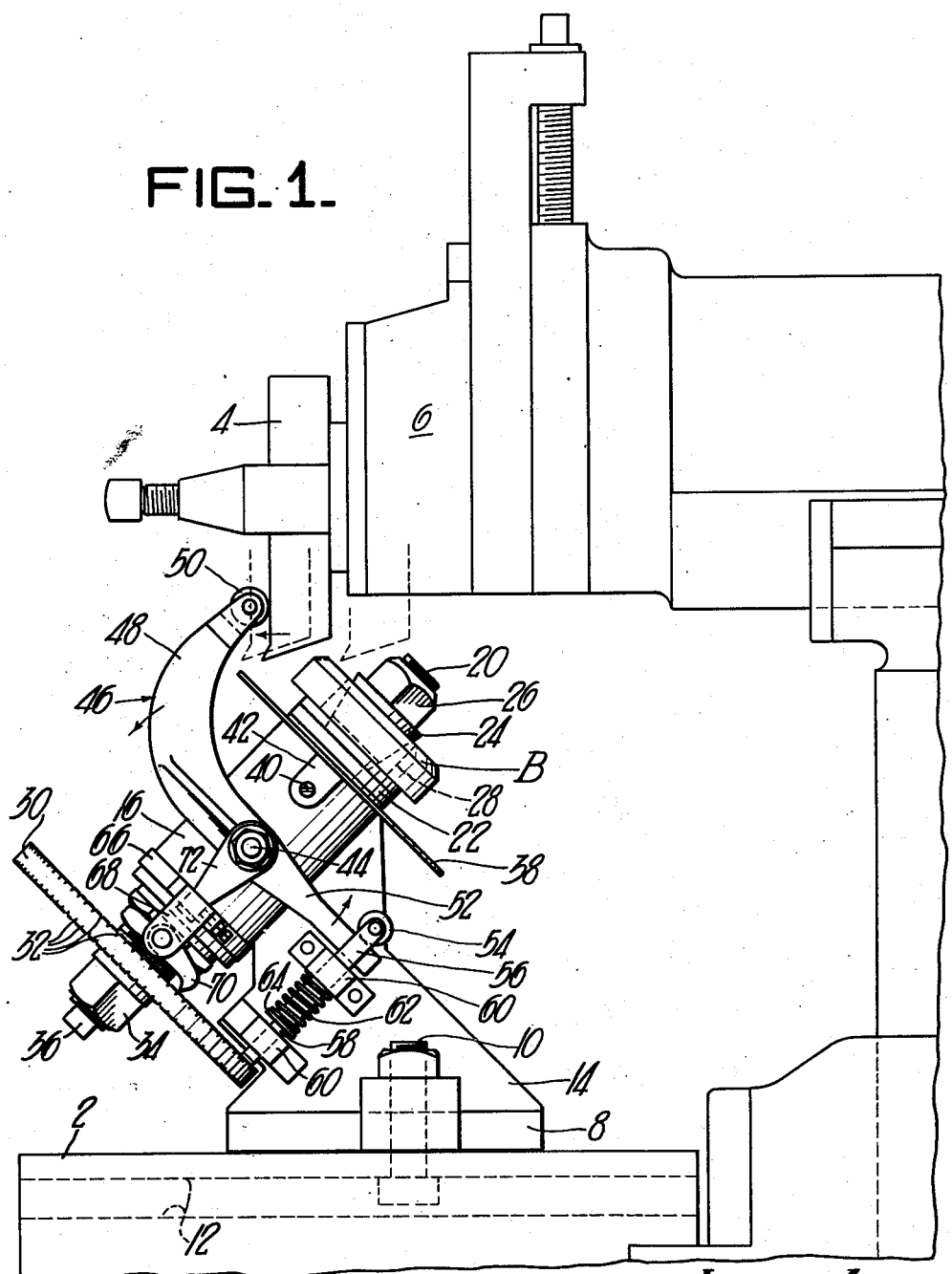

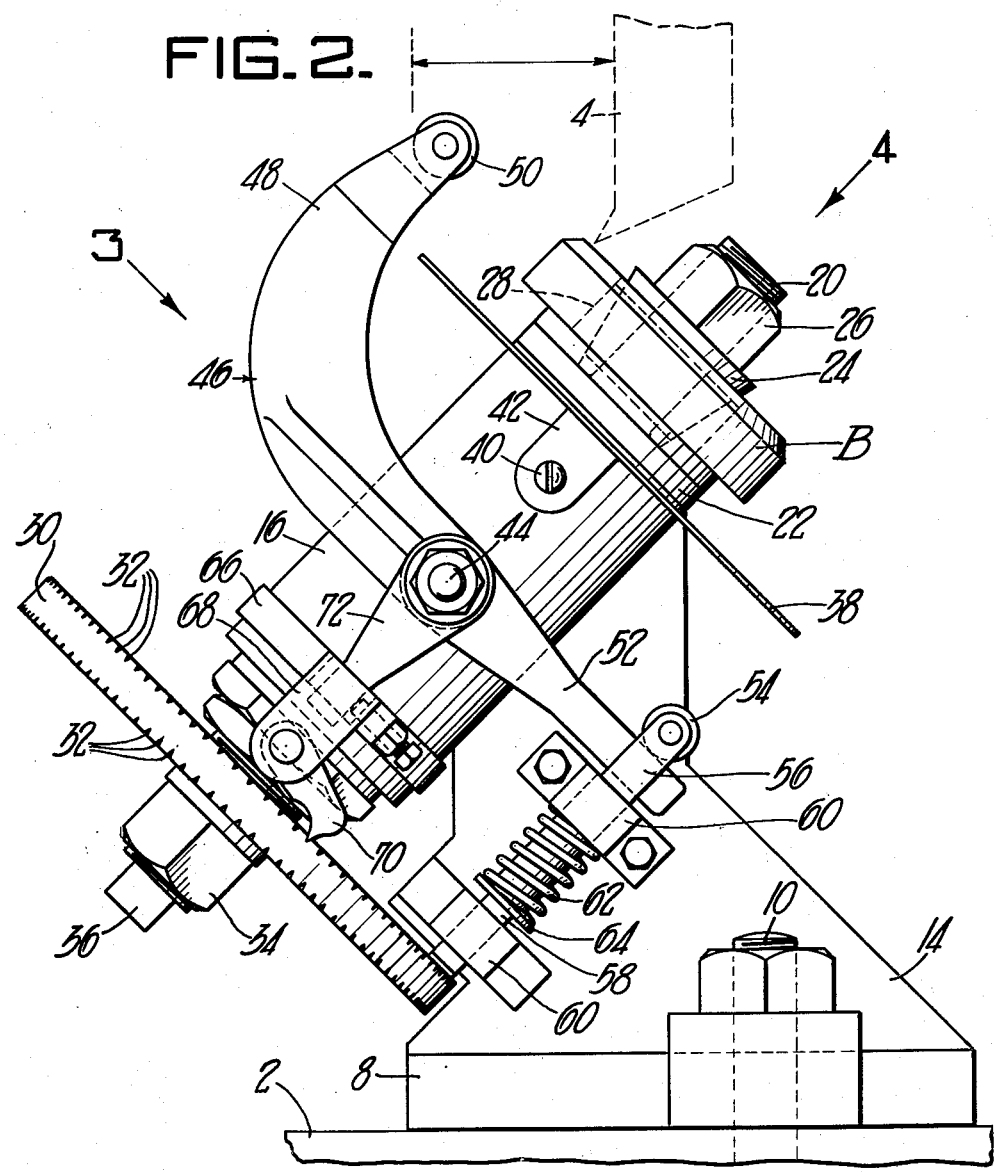

Sept. 16, 1952      F. W. RIEDEL      2,610,551
INDEXING DEVICE
Filed Sept. 11, 1946      4 Sheets-Sheet 4
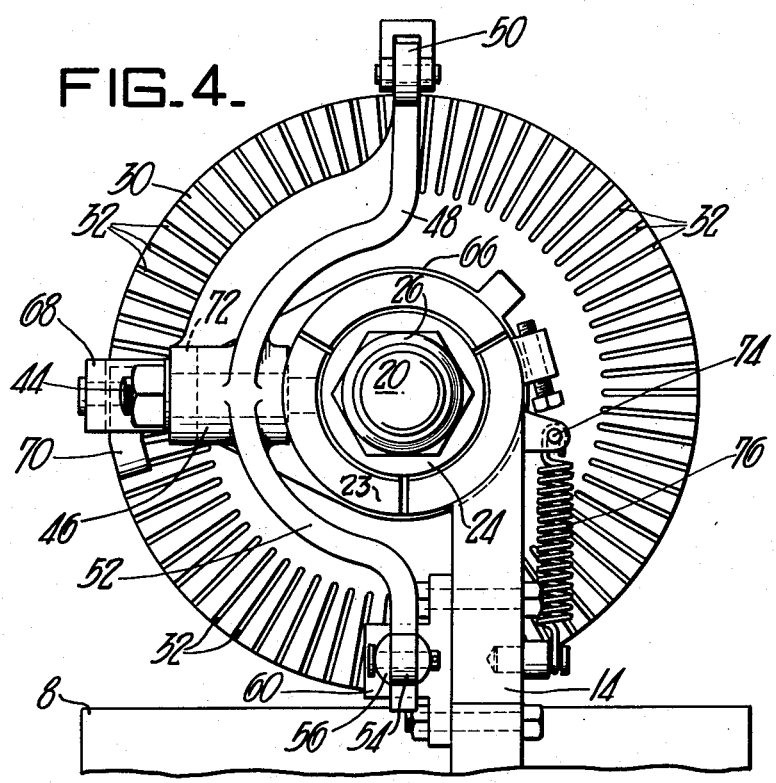
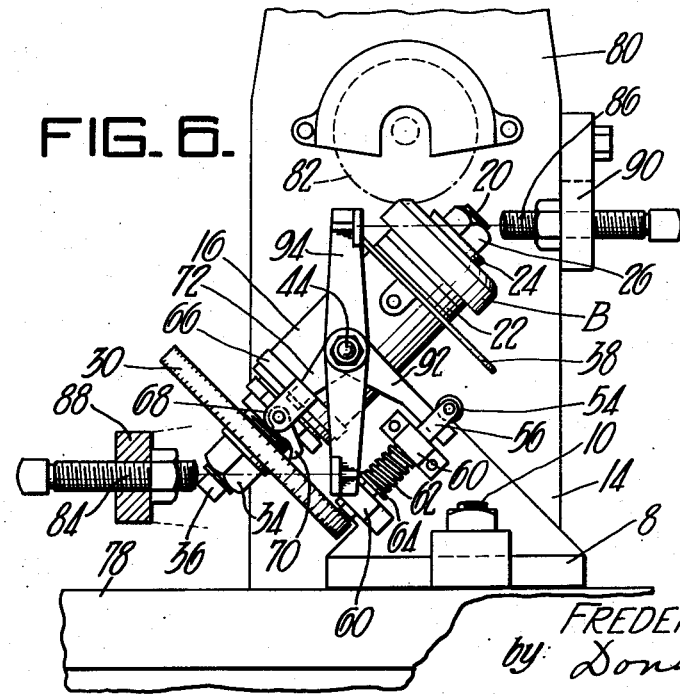
Inventor:
FREDERICK W. RIEDEL,
by Donald G. Dalton
his Attorney.

Patented Sept. 16, 1952

2,610,551

UNITED STATES PATENT OFFICE 2,610,551

INDEXING DEVICE

Frederick W. Riedel, Belle Vernon, Pa., assignor to United States Steel Company, a corporation of New Jersey Application September 11, 1946, Serial No. 696,291

12 Claims. (Cl. 90—29)

This invention relates to an automatic indexing device and more particularly to such a device for use with a conventional shaper or grinder for machining grooves in steel rolls, such as are used in rolling barbs or wire.

Prior to the development of the automatic indexing device of my invention the rolls were indexed by hand so that the machining took approximately four times as long as it does with the present invention. In addition, the operator often had to scrap a roll because of an error in the indexing.

It is therefore an object of my invention to provide an automatic indexing device particularly adapted to machine grooves in barbing rolls.

Another object is to provide such a device which can be used with either a reciprocating head or a reciprocating bed type of machine.

These and other objects will be more apparent after referring to the following specification and attached drawings, in which:

Figure 1 is an elevation showing the indexing device mounted on the bed of a shaper;

Figure 2 is an enlarged view similar to Figure 1, but omitting parts of the shaper;

Figure 3 is a view looking in the direction of the arrow 3 in Figure 2;

Figure 4 is a view looking in the direction of the arrow 4 in Figure 2;

Figure 5 is a sectional view taken on the line V—V of Figure 3; and

Figure 6 is an elevation showing the indexing device mounted on the reciprocating bed of a grinder.

Referring more particularly to Figures 1 to 5 of the drawings, the reference numeral 2 indicates the stationary bed of a conventional shaper. A cutting tool 4 is mounted in the usual way on the reciprocating toolhead 6. The indexing device of my invention is provided with a base 8 held in place on the bed 2 by means of bolts 10 having their heads received in grooves 12 in the bed 2. Extending upwardly from the base 8 is an upright web 14 which has a housing 16 welded or otherwise fastened to the top thereof. The housing 16 has an axial opening 18 therethrough which rotatably supports a shaft 20. As best shown in Figure 5, the upper end of the shaft is threaded and is provided with a shoulder 22 which serves as a bearing surface for the mandrel jaws 23. A tapered washer 24 fits over the shaft 20 with its outer surface bearing against the tapered bore 25 of the jaws 23. A nut 26 threaded on the shaft 20 forces the washer 24 inwardly so that the tapered surface of the jaws 23 and washer 24 move relatively to one another to force the jaws 23 outwardly against the axial bore 28 of the barbing roll blank B which rests against the shoulders 29 of the jaws 23. The nut 26 is pulled up tight to hold the blank B securely in position against the shoulders 29 so that it cannot rotate with respect to shaft 20. An indexing disk 30 is mounted on the lower end of the shaft 20 and is provided with indexing notches 32 around its periphery. The disk 30 is keyed on shaft 20 and held in place thereon by a nut 34. The shaft 20 is held from turning while the nuts 26 and 34 are tightened by means of a square portion 36 on the lower end of shaft 20. A chip guard 38 is attached to the top part of the housing 16 by means of screws 40 passing through brackets 42 secured to the chip guard.

Extending outwardly from the housing 16 is a pivot shaft 44 on which is mounted a three-armed lever 46. One arm 48 of the lever extends upwardly into the path of travel of the cutter 4 and supports a roller 50 at its upper end. The second arm 52 extends along the web 14 and under a roller 54 which is supported in the bifurcated end 56 of a lock pin 58. The pin 58 is slidably mounted in bearings 60 fastened to the web 14 and extends downwardly against the disk 30 into one of the notches 32 to lock it in place during the machining operation. A spring 62 surrounds the pin 58 with one end bearing against the upper bearing 60 and the other end against a shoulder 64 on the pin 58, thus urging the pin downwardly into contact with the disk 30. The round lower part of the housing 16 is surrounded by a ring 66 which is provided with a downwardly extending lug 68 for supporting a pawl 70. The third arm 72 of the lever is in operative engagement with the ring 66. On the side of the housing opposite the arm 72 the ring 66 is provided with a lug 74 to which is attached one end of a spring 76, the other end of the spring being attached to the web 14.

In operation the cutting tool 4, after putting a groove in the blank B, strikes the roller 50, thus rotating the three-armed lever 46 about its pivot 44. This raises the locking pin 58 against the pressure of the spring 62, thus releasing the indexing disk 30 and permitting it to rotate when the shaft 20 is rotated. At the same time the arm 72 rotates the ring 66 to move the pawl 70 into engagement with an indexing notch 32 on the disk 30. On completion of the forward stroke shown in dotted lines in Figure 1, the cutter 4 returns and releases the lever 46, thus permitting the spring 76 to bring the pawl 70 and the indexing disk 30 one notch forward to prepare the blank B for cutting the next notch therein. At the same time the pin 58 is released, thus permitting the spring 62 to lock the disk 30 in position during the next machining step. This operation is repeated until all the grooves are machined in the barbing roll blank B.

Figure 6 discloses a second modification of my invention in which the indexing device is mounted on the reciprocating bed 78 of a surface grinder which has a stationary toolhead 80 with a grinding wheel 82 mounted thereon. Adjustable stops 84 and 86 are secured to brackets 88 and 90, respectively, mounted on the stationary head 80. The pivot bolt 44 projects beyond the indexing disk 30 and the pawl bracket 68. A two-armed lever 92 is mounted on the bolt 44 in the same position as lever 46 of the first embodiment and replaces the arms 52 and 72 thereof. The third arm 48 of the lever is replaced by a two-armed lever 94 mounted on the end of the shaft, one arm extending downwardly to contact the stop 84 and the other end extending upwardly to contact the stop 86. The remaining parts of the indexing device are the same and function in the same manner as in the first embodiment.

In operation, when the reciprocating bed 78 is moved from right to left as shown in Figure 6, the lower portion of lever 94 contacts the stop 84 and causes the indexing disk 30 to be advanced one notch. When the bed 78 moves from left to right, the upper arm of lever 94 contacts stop 86 and again causes the disk 30 to be advanced one notch, thus making it possible to grind in both directions of travel. However, one of the stops may be removed thus causing the grinder to cut in the same notch of the barbing roll blank B for each complete traverse of the bed 78 with the disk 30 advancing only at one end of bed travel. It will be understood that the bed 78 is provided with the conventional stops which control its reciprocation with the stops of the bed 78 and the stops 84 and 86 being arranged to synchronize the travel of the bed 78 with the advancement of the disk 30.

While two embodiments of my invention have been shown and described, it will be apparent that other adaptations and modifications may be made without departing from the scope of the following claims.

I claim:

1. Apparatus for machining grooves in a roll or the like comprising a toolhead, a bed, said bed and tool being movable with respect to one another to machine a groove in said roll, a housing mounted on said bed, a work support rotatably mounted in said housing, an indexing disk mounted for movement with said work support, a three-armed lever pivotally mounted on said housing, a lock pin extending against said disk to hold it in position during the machining operation, one of said arms of said lever being operatively connected to said locking pin, the second of said arms being connected to rotate said disk, the third of said arms contacting said toolhead upon completion of the machining of each groove to rotate the lever about its pivot to release said lock pin and move the disk and the roll into position to machine the succeeding groove.

2. Apparatus for machining grooves in a roll or the like comprising a toolhead, a bed, said bed and tool being movable with respect to one another to machine a groove in said roll, a housing mounted on said bed, said housing having an axial opening therethrough, a shaft rotatably mounted in said opening, means on one end of said shaft for mounting a roll thereon for rotation therewith, an indexing disk mounted on the other end of said shaft for movement with said roll and said shaft, a three-armed lever pivotally mounted on said housing, a lock pin extending against said disk to hold it in position during the machining operation, one of said arms of said lever being operatively connected to said locking pin, the second of said arms being connected to rotate said disk, the third of said arms contacting said toolhead upon completion of the machining of each groove to rotate the lever about its pivot to release said lock pin and move the disk and the roll into position to machine the succeeding groove.

3. Apparatus for machining grooves in a roll having an axial bore therein which comprises a toolhead, a bed, said bed and tool being movable with respect to one another to machine a groove in said roll, a housing mounted on said bed, said housing having an axial opening therethrough, a shaft rotatably mounted in said opening, a shoulder on said shaft, a tapered washer mounted on one end of said shaft and adapted to extend into the bore of said roll, means for holding said roll in centered position on said shaft between said shoulder and said washer, an indexing disk mounted on the other end of said shaft for movement with said roll and said shaft, a lever having two arms pivotally mounted on said housing, one of said arms being connected to rotate said disk, the other of said arms contacting said toolhead upon completion of the machining of each groove to rotate the lever about its pivot and move the disk and the roll into position to machine the succeeding groove.

4. Apparatus for machining grooves in a roll or the like comprising a toolhead, a bed, said bed and tool being movable with respect to one another to machine a groove in said roll, a housing mounted on said bed, said housing having an axial opening therethrough, a shaft rotatably mounted in said opening, means on one end of said shaft for mounting a roll thereon for rotation therewith, an indexing disk mounted on the other end of said shaft for movement with said roll and said shaft, and a lever having two arms pivotally mounted on said housing, one of said arms being connected to rotate said disk, the other of said arms contacting said toolhead upon completion of the machining of each groove to rotate the lever about its pivot and move the disk and the roll into position to machine the succeeding groove.

5. Apparatus for machining grooves in a roll having an axial bore therein which comprises a toolhead, a bed, said bed and tool being movable with respect to one another to machine a groove in said roll, a housing mounted on said bed, said housing having an axial opening therethrough, a shaft rotatably mounted in said opening, a shoulder on said shaft, a tapered washer mounted on one end of said shaft and adapted to extend into the bore of said roll, means for holding said roll in centered position on said shaft between said shoulder and said washer, an indexing disk mounted on the other end of said shaft for movement with said roll and said shaft, a three-armed lever pivotally mounted on said housing, a lock pin extending against said disk to hold it in position during the machining operation, said disk having a plurality of notches therein, a ring rotatably mounted on said housing, a pawl mounted for movement with said ring, one of said arms of said lever being operatively connected to said locking pin, the second of said arms being operatively connected to said ring, and the third of said arms contacting said toolhead upon completion of the machining of each groove to rotate the lever about its pivot to release said lock pin and to move the pawl into position to rotate the disk and the roll into the succeeding machining position.

6. Indexing mechanism for a machine tool comprising a housing, a work support rotatably mounted in said housing, an indexing disk mounted for movement with said work support, a three-armed lever pivotally mounted on said housing, a lock pin extending against said disk to hold it in position during the machining operation, one of the arms of said lever being operatively connected to said locking pin, the second of said arms being connected to rotate said disk, and means for moving the third of said arms upon completion of a machining operation to rotate the lever about its pivot to release said lock pin and move the disk and the workpiece into position for a subsequent machining operation.

7. Indexing mechanism for a machine tool comprising a housing, said housing having an axial opening therethrough, a shaft rotatably mounted in said opening, means on one end of said shaft for mounting a workpiece thereon for rotation therewith, an indexing disk mounted on the other end of said shaft for movement with said workpiece and said shaft, a three-armed lever pivotally mounted on said housing, a lock pin extending against said disk to hold it in position during the machining operation, one of the arms of said lever being operatively connected to said locking pin, the second of said arms being connected to rotate said disk, and means for moving the third of said arms upon completion of a machining operation to rotate the lever about its pivot to release said lock pin and move the disk and the workpiece into position for a subsequent machining operation.

8. Indexing mechanism for a machine tool comprising a housing, said housing having an axial opening therethrough, a shaft rotatably mounted in said opening, a shoulder on said shaft, a tapered washer mounted on one end of said shaft and adapted to extend into the bore of a workpiece, means for holding said workpiece in centered position on said shaft between said shoulder and said washer, an indexing disk mounted on the other end of said shaft for movement with said workpiece and said shaft, a two-armed lever pivotally mounted on said housing, one of said arms being connected to rotate said disk, and means for moving the second of said arms upon completion of a machining operation to rotate the lever about its pivot to release said lock pin and move the disk and the workpiece into position for a subsequent machining operation.

9. Indexing mechanism for a machine tool comprising a housing, said housing having an axial opening therethrough, a shaft rotatably mounted in said opening, a shoulder on said shaft, a tapered washer mounted on one end of said shaft and adapted to extend into the bore of a workpiece, means for holding said workpiece in centered position on said shaft between said shoulder and said washer, an indexing disk mounted on the other end of said shaft for movement with said workpiece and said shaft, a three-armed lever pivotally mounted on said housing, a lock pin extending against said disk to hold it in position during the machining operation, said disk having a plurality of notches therein, a ring rotatably mounted on said housing, a pawl mounted for movement with said ring, one of said arms of said lever being operatively connected to said locking pin, the second of said arms being operatively connected to said ring, and means for moving the third of said arms upon completion of a machining operation to rotate the lever about its pivot to release said lock pin and move the disk and the workpiece into position for a subsequent machining operation.

10. Indexing mechanism for a machine tool comprising a housing, an indexing disk rotatably mounted on said housing, a three-armed lever pivotally mounted on said housing, a lock pin extending against said disk to hold it in position during the machining operation, one of the arms of said lever being operatively connected to said locking pin, the second of said arms being connected to rotate said disk, and means for moving the third of said arms upon completion of a machining operation to rotate the lever about its pivot to release said lock pin and move the disk into position for a subsequent machining operation.

11. Indexing mechanism for a machine tool comprising a housing, said housing having an axial opening therethrough, a shaft rotatably mounted in said opening, an indexing disk mounted on one end of said shaft for rotation therewith, a three-armed lever pivotally mounted on said housing, a lock pin extending against said disk to hold it in position during the machining operation, one of the arms of said lever being operatively connected to said locking pin, the second of said arms being connected to rotate said disk, and means for moving the third of said arms upon completion of a machining operation to rotate the lever about its pivot to release said lock pin and move the disk into position for a subsequent machining operation.

12. Indexing mechanism for a machine tool comprising a housing, said housing having an axial opening therethrough, a shaft rotatably mounted in said opening, an indexing disk mounted on one end of said shaft for rotation therewith, a three-armed lever pivotally mounted on said housing, a lock pin extending against said disk to hold it in position during the machining operation, said disk having a plurality of notches therein, a ring rotatably mounted on said housing, a pawl mounted for movement with said ring, one of said arms of said lever being operatively connected to said locking pin, the second of said arms being operatively connected to said ring, and means for moving the third of said arms upon completion of a machining operation to rotate the lever about its pivot to release said lock pin and move the disk into position for a subsequent machining operation.

FREDERICK W. RIEDEL.

REFERENCES CITED

The following references are of record in the file of this patent:

UNITED STATES PATENTS

| Number | Name | Date |
|---|---|---|
| 1,426,552 | Cross | Aug. 22, 1922 |
| 1,660,502 | Gleason et al. | Feb. 28, 1928 |
| 1,825,112 | Finsen | Sept. 29, 1931 |
| 1,902,520 | Randles | Mar. 21, 1933 |
| 2,090,649 | Tetreault | Aug. 24, 1937 |
| 2,187,544 | Laessker | Jan. 16, 1940 |
| 2,359,601 | Andrew et al. | Oct. 3, 1944 |
| 2,392,964 | Armitage et al. | Jan. 15, 1946 |
| 2,396,941 | Corrigan et al. | Mar. 19, 1946 |

FOREIGN PATENTS

| Number | Country | Date |
|---|---|---|
| 473,440 | Germany | Mar. 16, 1929 |